(12) United States Patent
Holzapfel

(10) Patent No.: US 7,796,272 B2
(45) Date of Patent: Sep. 14, 2010

(54) POSITION-MEASURING DEVICE FOR MEASURING A POSITION OF AN OBJECT RELATIVE TO A TOOL HAVING A TOOL CENTERPOINT

(75) Inventor: Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 211 days.

(21) Appl. No.: 12/110,929

(22) Filed: Apr. 28, 2008

(65) Prior Publication Data
US 2008/0282566 A1 Nov. 20, 2008

Related U.S. Application Data

(60) Provisional application No. 60/938,271, filed on May 16, 2007.

(30) Foreign Application Priority Data

May 16, 2007 (DE) ............... 10 2007 023 300

(51) Int. Cl.
*G01B 9/02* (2006.01)
(52) U.S. Cl. .................................................. 356/510
(58) Field of Classification Search ................ 356/499, 356/510; 250/237 G
See application file for complete search history.

(56) References Cited

U.S. PATENT DOCUMENTS 3,884,580 A 5/1975 Webster et al.
4,074,131 A 2/1978 Schwebel
5,977,539 A 11/1999 Holzapfel et al.
6,838,688 B2 1/2005 Aoki
6,885,457 B1 4/2005 Michel et al.
7,019,842 B2 3/2006 Holzapfel et al.

(Continued)

FOREIGN PATENT DOCUMENTS

DE 25 21 618 3/1976

(Continued)

OTHER PUBLICATIONS

PCT International Search Report, PCT International Application No. PCT/EP2008/003552, dated Aug. 14, 2008 (translated).

(Continued)

*Primary Examiner*—Hwa S. A Lee
(74) *Attorney, Agent, or Firm*—Kenyon & Kenyon LLP

(57) ABSTRACT

A position-measuring device is used for measuring the position of an object relative to a tool, the tool having a tool center point. The position-measuring device includes at least two intersected scales displaceable relative to each other in at least one plane of movement, and an assigned optical scanning unit which generates position signals for at least one measuring direction parallel to the plane of movement. Each scale has a neutral pivot, about which a tilt of the respective scale causes no change of the detected position. The scanning optics ensure that the position of the neutral pivots of the two scales correspond. The positioning of the scales relative to the tool center point ensures that the neutral pivots of the two scales and the tool center point lie in a plane which is parallel to the plane of movement.

20 Claims, 11 Drawing Sheets

U.S. PATENT DOCUMENTS

| | | |
|---|---|---|
| 7,636,165 B2 * | 12/2009 | Klaver et al. ............... 356/499 |
| 2007/0013920 A1 | 1/2007 | Holzapfel |
| 2008/0062432 A1 | 3/2008 | Sandig et al. |
| 2008/0285058 A1 * | 11/2008 | Holzapfel ................. 356/616 |

FOREIGN PATENT DOCUMENTS

| | | |
|---|---|---|
| DE | 86 28 805 | 3/1989 |
| DE | 101 33 266 | 3/2002 |
| DE | 10 2005 029 917 | 1/2007 |
| DE | 10 2006 042 743 | 3/2008 |
| EP | 0 163 362 | 2/1985 |
| EP | 0 387 520 | 9/1990 |
| EP | 0 482 553 | 4/1992 |
| EP | 1 347 271 | 9/2003 |
| EP | 1 734 394 | 12/2006 |
| EP | 1 739 395 | 1/2007 |
| EP | 1 837 630 | 3/2007 |
| WO | WO 02/23131 | 3/2002 |
| WO | WO 2007/034379 | 3/2007 |

OTHER PUBLICATIONS

PCT International Search Report, PCT International Application No. PCT/EP2008/003553, dated Sep. 1, 2008 (translated).

* cited by examiner

PRIOR ART

POSITION-MEASURING DEVICE FOR MEASURING A POSITION OF AN OBJECT RELATIVE TO A TOOL HAVING A TOOL CENTERPOINT

CROSS-REFERENCE TO RELATED APPLICATIONS

The present application claims the benefit of U.S. Provisional Patent Application No. 60/938,271, filed on May 16, 2007, and claims priority to Application No. 10 2007 023 300.2, filed in the Federal Republic of Germany on May 16, 2007, each of which is expressly incorporated herein in its entirety by reference thereto.

FIELD OF THE INVENTION

The present invention relates to a position-measuring device for measuring the position of an object relative to a tool in at least two dimensions.

BACKGROUND INFORMATION

For example, position-measuring devices of this kind may be used for a wafer-inspection machine in which an optical, electron-optical or ion-optical microscope must be positioned very precisely over a silicon wafer. The wafer represents the object, the microscope is the tool. Instead of microscopes, however, any other sensors and processing tools may be used as a tool. Quite generally, the range of application includes any extremely precise, (at least) two-dimensional positioning.

For the high-precision measurement of one-dimensional positions, generally position-measuring devices or encoders are used which optically scan a grating scale, and in so doing, generate incremental sinusoidal signals and cosinusoidal signals. Such signals are interpolated in the evaluation electronics, so that a very small measuring step results, which only now amounts to a small fraction of the signal period. In this context, measuring steps of fractions of a nanometer are completely feasible.

In the case of a two-dimensional position determination in the X-direction and Y-direction, often two one-dimensional sliding units are used which are disposed perpendicularly relative to each other, and which in each case are equipped with a one-dimensional encoder. In this context, until now it has not been possible to comply with the "Abbe principle", so that measuring errors result due to tilt errors in the linear guides. The Abbe principle requires that the respective measuring system be aligned coaxially with respect to the shift direction in which measurements are to be made. As a rule, the Abbe distances, that is, the distances between the measuring axes of the encoders and the center of the tool, hereinafter referred to as tool center point or TCP, are considerable. According to the definition used here, the measuring axis of an encoder extends through the effective measuring point of the encoder along a measuring direction. However, the straightness deviations of the linear guides also lead to measuring errors which are not detected by the encoders. Both error influences are only partially reproducible, so that even a machine calibration often cannot furnish the precision required. Typical non-reproducibility because of guide deviations are in the range of 100 nm.

For these reasons, plane-mirror laser interferometers are used today for high-precision, two-dimensional position determinations. The measuring axes of two plane-mirror laser interferometers perpendicular to each other are arranged in conformance with the Abbe condition such that they intersect in the fixed TCP. In this manner, all guide deviations of the XY-table are detected, and therefore no longer have any appreciable influence on the accuracy. However, laser interferometers operated in air have the disadvantage that fluctuations in the refractive index of the air lead to substantial measuring errors. Thus, given an air gap of 30 cm, even under favorable laboratory conditions, one must expect errors of 20 nm to 50 nm. This is not sufficient for the rising number of applications having an accuracy requirement of 1-10 nm.

German Patent No. 25 21 618 describes a configuration of two crossed scales, which are optically scanned at the point of intersection. The one scale bears a "longitudinal graduation", that is, a grating having grating lines parallel to the narrow edge of the scale surface. The second scale is provided with a transverse graduation, that is, the grating lines extend parallel to the long edge of the scale surface. Due to the perpendicular arrangement of the longitudinal graduation and transverse graduation, the grating lines are parallel to each other, so that the relative position may be recorded at the point of intersection using suitable scanning optics.

To record position in conformance with the Abbe condition, the longitudinal graduation in the XY-plane is aligned with respect to the TCP and, like the TCP, is fixed. The transverse graduation is secured to the XY-table. The second measuring direction includes a second perpendicularly disposed pair of longitudinal graduation and transverse graduation, whose longitudinal graduation in the XY-plane is likewise oriented to the TCP. The two scanning optical systems must each be shifted along the longitudinal graduations, so as constantly to be able to scan at the points of intersection. However, German Patent No. 25 21 618 describes no suitable scanning optics, nor does it give any instructions as to how the scanning optics are to be guided along the longitudinal graduation. Upon more careful observation, the Abbe distances are brought to zero only in the XY-plane. However, Abbe distances unequal to zero remain in the Z-direction, since the graduations (reference numerals 3 and 8 in FIG. 2 of German Patent No. 25 21 618) and the object (reference numeral 6 in FIG. 2 of German Patent No. 25 21 618) are disposed in different Z-positions. Tiltings of the table about the X-axis or Y-axis therefore continue to lead to measuring errors.

Further details regarding a measuring system of this kind are described in European Published Patent Application No. 1 734 394. For example, specific arrangements are described for the necessary guideways of the scanning heads along the longitudinal graduations. No suitable scanning optics are described. The Abbe distances in the Z-direction are not taken into consideration, as is evident from FIG. 3 of European Published Patent Application No. 1 734 394.

PCT International Published Patent Application No. WO 2007/034379 describes various scanning optics for position-measuring devices of this nature, in order to scan the longitudinal and transverse graduations in such configurations. The Abbe distance in the Z-direction is neither mentioned nor considered or minimized, either. Upon more careful analysis, the scanning optics described are hardly suitable for the measuring task, since the effective measuring point of the scanning optics, hereinafter referred to as the neutral pivot (NP) of the encoder, cannot be leveled with the object in the Z-direction. A method for analyzing the position of the neutral pivot is described further below, and leads to the following results. The neutral pivot of the scanning optics according to FIG. 5 or 6 of PCT International Published Patent Application No. WO 2007/034379 lies far above the grating having reference numeral 5, approximately at the distance of the first grating having reference numeral 5 from the grating having reference numeral 4. When scanning according to the configurations described (FIG. 3 of PCT International Published Patent Application No. WO 2007/034379), a considerable Abbe distance therefore inevitably results in the Z-direction. The scanning optics according to FIG. 8 of PCT International Published Patent Application No. WO 2007/034379 have a neutral pivot at the height of the grating having reference numeral 4. Since the mirror having reference numeral 7 in the Z-direction projects beyond the grating plane, which then optimally would have to be the object plane, this configuration is not compatible with the normally small distance between tool and object, since the tool and the mirror having reference numeral 7 stand in the way of each other. Something similar holds true for the scanning optics according to FIGS. 9 and 10 in PCT International Published Patent Application No. WO 2007/034379, as well. The neutral pivot of the scanning optics according to FIGS. 11 and 12 of PCT International Published Patent Application No. WO 2007/034379 lies far below the grating having reference numeral 4, approximately at the distance of the grating having reference numeral 4 from the grating having reference numeral 5. A leveling of the Z-position of the neutral pivot with the object is impossible here, as well.

European Published Patent Application No. 1 734 394 and PCT International Published Patent Application No. WO 2007/034379 exclusively describe scanning optics for position-measuring devices of the kind which are disposed and moved above the stationary scale having the longitudinal graduation.

European Published Patent Application No. 1 837 630 describes further scanning optics for scanning longitudinal and transverse graduations. In the various specific described therein, there is no information concerning the suitable Z-position of the neutral pivots and their position relative to the object to be measured. An additional measurement in the Z-direction at least three positions of the table is described, so that all six degrees of freedom of the table are included. The tilts Rx and Ry about the main axes of motion X and Y of the table can therefore be corrected by suitable digital signal processing. However, this requires considerable extra expenditure for the additional measurements of Rx and Ry, which is only justified in the case of very costly machines such as wafer steppers. The additional measurement of the Rx-tilt and Ry-tilt is necessary, since these tilts must be changed in operation by suitable actuators. For most other applications such as, for example, for wafer-inspection machines, no Rx- and Ry-actuators are used, so that basically, one could dispense with their measurement. However, the less than ideal position of the neutral pivots in the direction of the Z-axis remains again in this case.

German Patent No. 25 21 618, European Published Patent Application No. 1 734 394, PCT Published Patent Application No. WO 2007/034379 and European Published Patent Application No. 1 837 630 discussed above each confine themselves to machine designs having a fixed TCP. They give no information as to how other machine designs having a moving TCP can be improved by crossed longitudinal and transverse graduations.

Furthermore, the interpolation accuracy of the position-measuring devices or encoders must be considered. Since in the case of machines, axis directions X and Y are often at the same time the main movement directions as well, the transverse graduations are moved along the grating lines. Signal interferences due to grating tolerances lead to interpolation errors which cannot be offset by electronic compensation methods, since for an adequate error correction, these compensation methods always need a phase shift of the signals, and therefore a movement component in the measuring direction, as well.

SUMMARY

Example embodiments of the present invention provide a position-measuring device for at least two-dimensional position determination that ensures a substantially higher accuracy than conventional systems. In this connection, the intention in particular is to provide scanning optics for position-measuring devices of this kind that also make it possible to reduce the Abbe distances in the Z-direction to zero.

The position-measuring device of example embodiments of the present invention for measuring the position of an object relative to a tool—the tool having a tool center point—includes at least two intersected scales displaceable relative to each other in at least one plane of movement, and an assigned optical scanning unit which generates position signals for at least one measuring direction parallel to the plane of movement. Each scale has a neutral pivot, about which a tilting of the respective scale causes no change of the detected position. The scanning optics ensure that the position of the neutral pivots of the two scales coincide. The arrangement of the scales relative to the tool center point ensures that the neutral pivots of the two scales and the tool center point lie in a plane which is parallel to the plane of movement.

The scanning optics may include the following components:
- a spatially-fixed or space-bound scale having a graduation,
- a scale that intersects and is movable relative to the spatially-fixed scale, and has a graduation,
- a scanning unit, the movable scale being situated below the spatially-fixed scale, and the scanning unit being situated below the movable scale, so that the neutral pivots of the two scales are located in an area between the two scales or on the movable scale.

The positional deviations of the neutral pivots from the tool center point in a direction perpendicular to the plane of movement may be less than 1 mm.

The graduation of the movable scale may be applied on the side of the scale facing the spatially-fixed scale.

The graduation of the movable scale and the tool center point may be situated in a plane which is parallel to the plane of movement.

The graduation of the movable scale may take the form of a transmitted-light graduation.

The scanning unit may include a light source as well as at least one photoelement which are positioned such that:
- the beam of rays emitted by the light source strikes the graduation of the movable scale at an impact location where the beam of rays is split into several partial beams of rays,
- the split partial beams of rays then strike the graduation of the spatially-fixed scale where they are reflected back in the direction of the movable scale, where the partial beams of rays reflected back are superposed at a combining location on the graduation of the movable scale and brought to interference,
- from the combining location on the graduation of the movable scale, beams of rays exit in at least one spatial direction and arrive at the at least one photoelement in the scanning unit where photoelectric currents, modulated as a function of displacement, result.

The scanning unit may also include a plurality of photoelements, and at the combining location on the graduation of the movable scale, several beams of rays may exit in different spatial directions and arrive at the plurality of photoelements, where a plurality of phase-shifted photoelectric currents, modulated as a function of displacement, result.

The graduation of the movable scale may take the form of a phase grating having a line width of ⅓*dm and a phase height of 120°, dm indicating the graduation period of the graduation of the movable scale, so that phase-shifted photoelectric currents having a phase shift of 120° result at the photoelements.

The graduation of the spatially-fixed scale may be in the form of a reflective graduation.

The angle of illumination of the beam of rays exiting from the light source may be less than 20°.

The spatially-fixed scale may have both a graduation and at least one reflector element, which are positioned such that:
the split partial beams of rays strike the graduation of the spatially-fixed scale, the graduation deflecting the partial beams of rays in the measuring direction and focusing them transversely to the measuring direction,
the partial beams of rays are subsequently reflected by the at least one reflector element,
and again arrive at the graduation of the spatially-fixed scale, the graduation again deflecting the partial beams of rays in the measuring direction and collimating them again transversely to the measuring direction, so that they are reflected back in the direction of the movable scale.

The graduation of the spatially-fixed scale may take the form of a diffractive structure which represents a superposition of a grating deflecting in the measuring direction and a diffractive cylindrical lens focusing transversely to the measuring direction.

The spatially-fixed scale includes both a graduation and a prism, the partial beams of rays falling on the spatially-fixed scale initially striking the graduation of the spatially-fixed scale, the graduation deflecting the partial beams of rays in the measuring direction. The partial beams of rays are subsequently reflected by the prism and arrive again at the graduation of the spatially-fixed scale, the graduation again deflecting the partial beams of rays in the measuring direction, so that they are reflected back in the direction of the movable scale.

The prism may take the form of a 90°-roof prism.

The graduation of the spatially-fixed scale may be in the form of a back-surface reflective graduation.

The scanning unit may include a light source as well as at least one photoelement which are positioned such that:
the beam of rays emitted by the light source strikes the graduation of the movable scale at a splitting location where the beam of rays is split into several partial beams of rays,
the split partial beams of rays then strike the graduation of the spatially-fixed scale where they are reflected back in the direction of the movable scale, where the partial beams of rays reflected back—offset with respect to the splitting location—strike graduations of the movable scale that deflect them in the measuring direction and focus them in a direction perpendicular to the measuring direction, in order after reflection at reflectors of the movable scale, to be diffracted once more by these graduations and, after a further diffraction at the graduation of the spatially-fixed scale, to arrive at the combining location on the graduation of the movable scale at which beams of rays exit in at least one spatial direction and arrive at the at least one photoelement in the scanning unit where photoelectric currents, modulated as a function of displacement, result.

Moreover, it is possible for graduation lines of the graduations of the spatially-fixed scale and of the movable scale to be inclined at 45° with respect to the outer edges of the respective scales.

Further features and aspects of example embodiments of the present invention are explained in more detail below in the following description and with reference to the appended Figures.

BRIEF DESCRIPTION OF THE DRAWINGS

FIG. 11b shows a transverse view of the scanning optics of the position-measuring device illustrated in FIG. 11a.

FIG. 13b shows a transverse view of the scanning optics of the position-measuring device illustrated in FIG. 13a.

DETAILED DESCRIPTION

Figure 1:
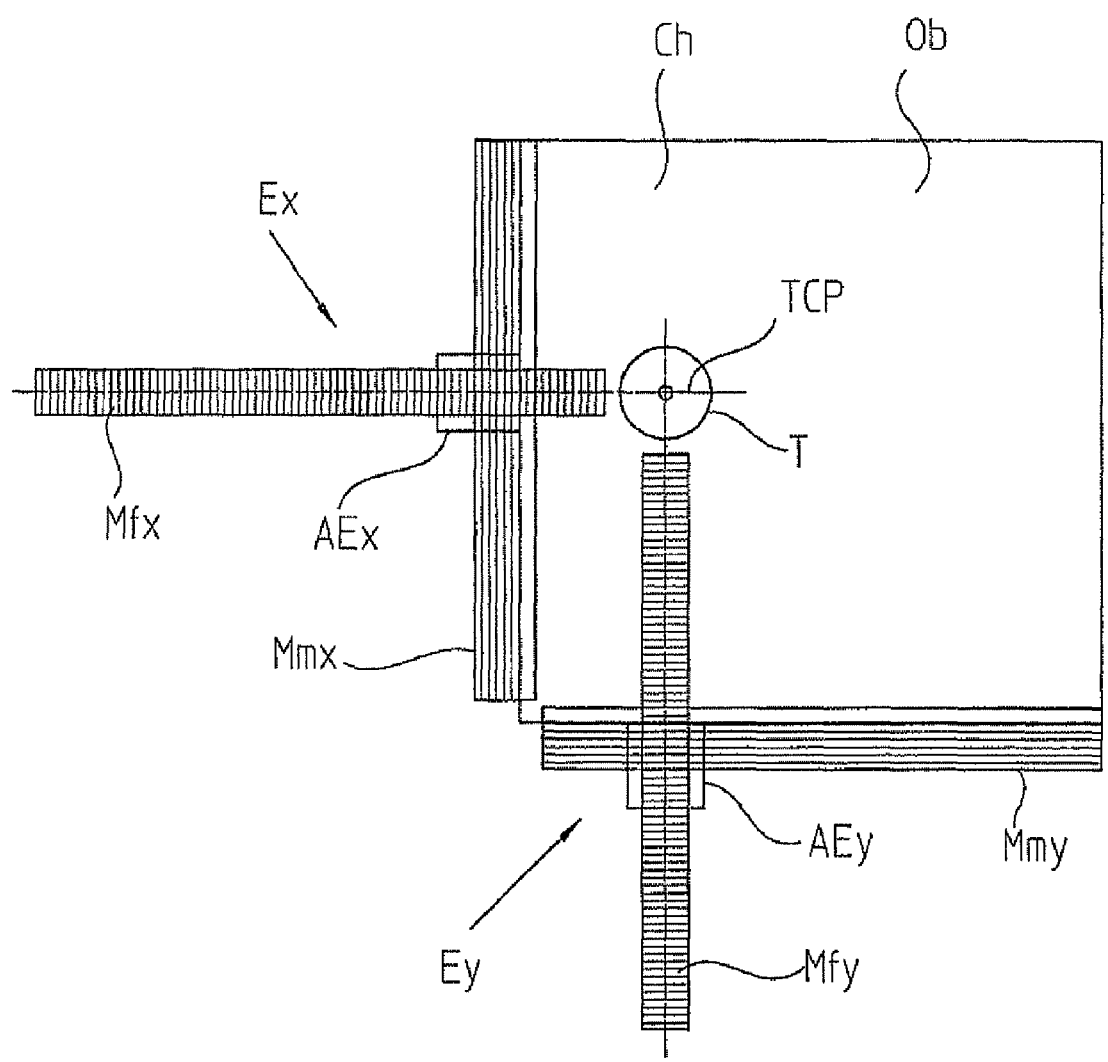
FIG. 1 shows a conventional configuration of position-measuring devices at an XY-table.

FIG. 1 shows a conventional configuration of an XY-table Ch movable in the X-direction and Y-direction and having two position-measuring devices or encoders Ex and Ey, as described, for example, in German Patent No. 25 21 618 mentioned above. Object Ob lying on XY-table Ch is to be positioned relative to tool T with its TCP. To that end, the two position-measuring devices Ex and Ey determine the X-position and Y-position, respectively, of table Ch in its plane of movement XY. X-encoder Ex, that is, the X-position measuring device is made up of a fixed scale Mfx having a graduation Gfx in the form of a longitudinal graduation, and a scale Mm secured to XY-table Ch and moved with it and having a graduation Mmx in the form of a transverse graduation, as well as a scanning unit AEx. Scanning unit AEx is displaceable only in the X-direction and moves with the X-position of XY-table Ch, that is, together with the X-position of moved scale Mm. Scanning unit AEx is thereby able to scan both graduations Mfx and Mmx in the intersection area. Analogously, Y-encoder Ey, that is, the Y-position-measuring device includes components Mfy, Mmy and AEy, scanning unit AEy being displaceable only in the Y-direction and moving along together with the Y-position of XY-table Ch. For the sake of clarity, no drive elements such as linear or planar motors, nor guide elements are shown in FIG. 1.

In the following, position-measuring devices according to example embodiments of the present invention, particularly their respective scanning optics, are explained with reference to FIGS. 2-13b. In so doing, terminology consistent with the description above is used.

To be able to eliminate the Abbe distances in the Z-direction, that is, to reduce them to zero, the exact knowledge of the effective measuring point of a position-measuring device is needed. This effective measuring point must then be disposed with respect to the TCP along the respective measuring direction.

The effective measuring point of a conventional position-measuring device, made up of only one scale having a graduation or a scale grating and a scanning unit, is usually denoted as neutral pivot NP of the position-measuring device. No phase shift occurs in response to a tilt of the scale or the scanning unit about neutral pivot NP. The position value indicated remains constant in first order.

In the encoder arrangement of example embodiments of the present invention having two crossed scales Mf, Mm, there are two neutral pivots NPm and NPf. The position indicated remains constant when scale Mm is tilted about pivot NPm and/or scale Mf is tilted about pivot NPf. As a rule, both neutral pivots NPm, NPf do not coincide. Suitable scanning optics ensure that the position of the neutral pivots NPm, NPf of both scales correspond.

Figure 2:
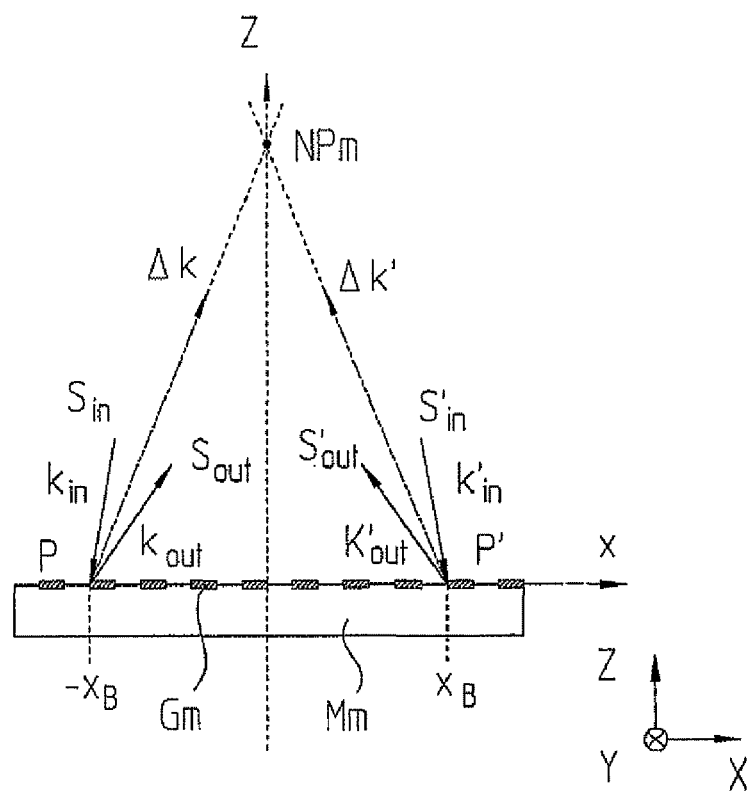
FIG. 2 shows the position of neutral pivot NPm in the case of a symmetrical diffraction at a scale having a reflective graduation.

First of all, the tilt of movable scale Mm is considered, since neutral pivot NPm represents the effective measuring point of the position-measuring device. To be able to determine the position of neutral pivot NPm, it is necessary to consider the different phase shifts of the two interfering partial beams of rays in response to the diffraction and/or possibly reflection at tilted scale Mm. FIG. 2 shows the case for two partial beams of rays which are diffracted symmetrically at graduation Gm in the form of a reflective graduation on scale Mm. However, the observation holds true analogously for transmitted-light graduations as well, i.e., graduations which are transilluminated, or for non-symmetrical cases. The two incoming partial beams of rays $S_{in}$ and $S'_{in}$ having the k-vectors $k_{in}$ and $k'_{in}$ are diffracted into exiting partial beams of rays $S_{out}$ and $S'_{out}$ having the k-vectors $k_{out}$ and $k'_{out}$. The phase shifts $\Delta\Phi$ and $\Delta\Phi'$, respectively, of the two partial beams of rays in response to any small movement of scale Mm are given by $$\Delta\Phi=(\vec{k}_{out}-\vec{k}_{in})\cdot\Delta\vec{x}_P=\Delta\vec{k}\cdot\Delta\vec{x}_P \text{ and } \Delta\Phi'=(\vec{k}'_{out}-\vec{k}'_{in})\cdot\Delta\vec{x}_{P'}=\Delta\vec{k}'\cdot\Delta\vec{x}_{P'},$$

respectively, $\Delta x_P$ and $\Delta x_{P'}$, representing the movement of scale Mm at impact points P and P', respectively. In the event of tilting motions of scale Mm, $\Delta x_P$ and $\Delta x_{P'}$ are different. Vectors $\Delta k$ and $\Delta k'$ indicated at these points each define straight lines which intersect at one point. This point represents neutral pivot NPm of the position-measuring device, because a tilt of scale Mm about this point moves the two impact points P and P' in first order perpendicularly to vectors $\Delta k$ and $\Delta k'$, respectively, so that according to the formulas above, no phase shifts occur. For position-measuring devices in which the partial beams of rays strike scale Mm repeatedly, the individual neutral pivots NPm of each interaction such as diffraction, reflection and or transmission must be averaged arithmetically, in order to obtain neutral pivot NPm of the position-measuring device.

Neutral pivot NPm of the position-measuring device must be leveled with the object, that is, brought to the same Z-position. Since in most cases, the object surface interacts with the tool, the surface also serves as reference height. Normally, the TCP lies on it. Only with the leveling can the Abbe distance in the Z-direction also be eliminated. The necessary accuracy of the leveling may easily be calculated: In the case of customary guide deviations of 20 μrad and a required positioning accuracy of the table of 5 nm, a maximum Abbe distance of 5 nm/20 μprad=250 μm results. Therefore, the leveling must be considered very carefully in the design, since otherwise, positioning accuracies of tables in the nanometer range cannot be achieved. To that end, according to FIG. 3, neutral pivot NPm of the position-measuring device must in each case lie below fixed scale Mf bearing graduation Gf, since object OB should be moved below fixed scale Mf. A safety distance Dmin can be maintained, which in practice should be, e.g., at least 0.5 mm. On the other hand, neutral pivot NPm should also not lie below moved scale Mm having graduation Gm. Otherwise, moved scale Mm would have to project beyond object OB. Given the customary, very small distances between tool T and object OB, the range of motion would have to be restricted considerably in order to prevent a collision between tool T and moved scale Mm. For the same reasons, however, the scanning optics should also require no elements such as path-folding mirrors which project beyond neutral pivot NPm. Optimally, Z-positions of neutral pivot NPm are in area B (see FIG. 3) between the two scales Mf and Mm. This area B is bounded by minimum distance Dmin from fixed scale Mf, and reaches up to moved scale Mm.

Besides the position of neutral pivot NPm, the position of neutral pivot NPf with respect to fixed scale Mf is also important. Neutral pivot NPf may be determined using the same method outlined above. The optimal position of neutral pivot NPf may be found if one considers interferences of the measuring compasses. Due to thermal or time-related drift effects or changing mechanical forces, scale Mf joined fixedly to tool T may move relative to object OB and scale Mm fixedly joined to it. While linear movements are detected by the position-measuring device, as a rule, tilting movements lead to measuring errors. Only if the lever arm for the shift of the TCP, which may be regarded as the neutral pivot of the tool, and the lever arm for the shift of the position of the position-measuring device are identical, can measuring errors be avoided. That is, the Z-position of neutral pivot NPf and of the TCP must correspond. Consequently, an optimal position-measuring device must have identical neutral pivots NPm and NPf. Therefore, according to example embodiments of the present invention, the arrangement of scales Mm, Mf relative to tool center point TCP ensures that neutral pivots NPm, NPf and tool center point TCP are in a plane which lies parallel to plane of movement XY. This condition holds true for all three spatial components X, Y and Z.

In the following, with reference to FIGS. 4a-13b, various example embodiments of scanning optics of position-measuring devices, and corresponding scale configurations which ensure the observance of this condition are described.

First Example Embodiment of Scanning Optics of a Position-measuring Device

Figure 4A:
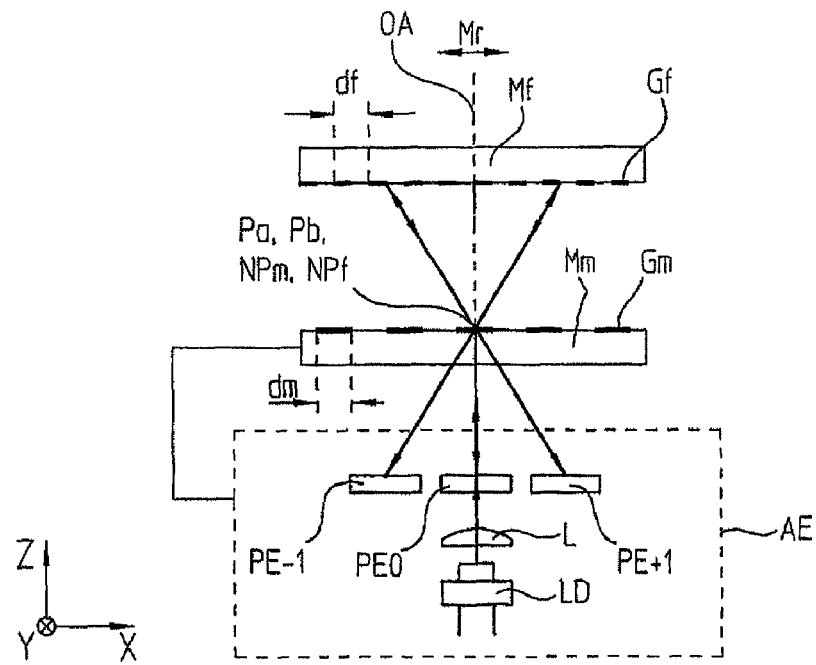
FIG. 4a shows a front view of scanning optics of a position-measuring device according to an example embodiment of the present invention.
Figure 4B:
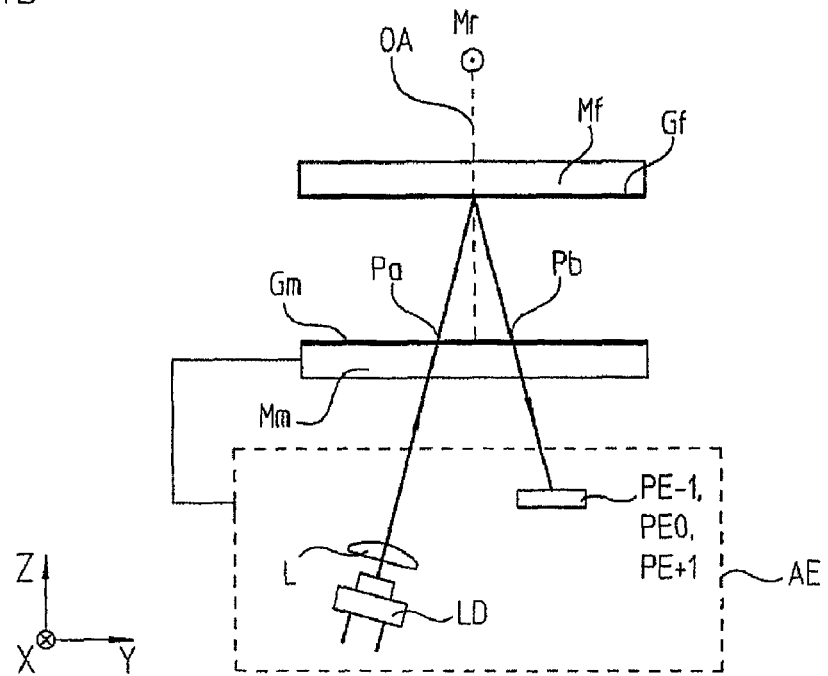
FIG. 4b shows a transverse view of the scanning optics of the position-measuring device.
Figure 5:
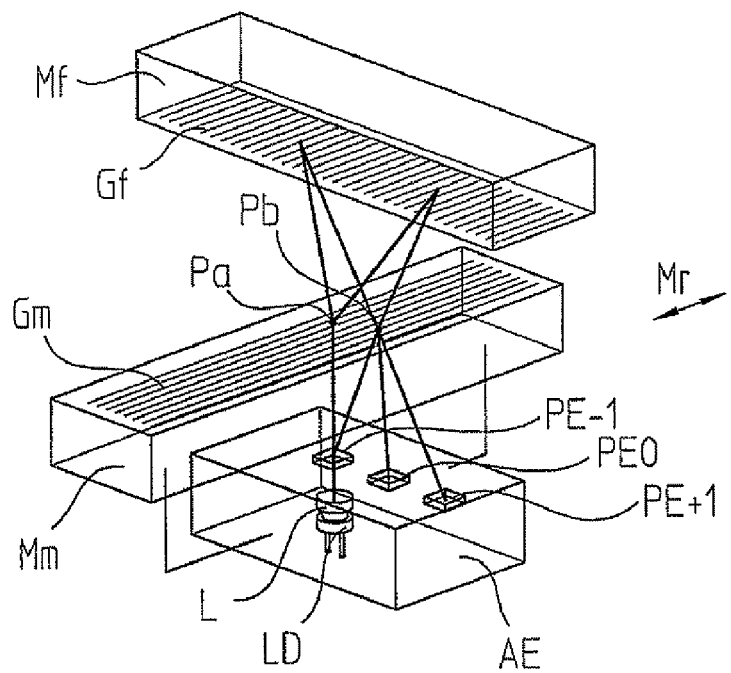
FIG. 5 shows a perspective view of the scanning optics shown in FIGS. 4a and 4b.

FIGS. 4a, 4b and 5 show a first example embodiment of scanning optics of a position-measuring device, having two scales Mm and Mf movable relative to each other in measuring direction Mr, as well as a scanning unit AE. A corresponding position-measuring device may be used in a configuration as illustrated in FIG. 1, e.g., as an X-encoder and as a Y-encoder.

Before the scanning-ray trajectory of the scanning optics is described below, it should first be pointed out that the scanning optics include all the components in the scanning-ray trajectory via which displacement-dependent output signals are generated, thus, in addition to the two scales Mm and Mf, also scanning unit AE together with the components disposed in it such as, for instance, a light source LD, a lens L as well as a plurality of photoelements PE0, PE-1, PE+1.

The beam of rays from a light source LD in the form of a laser diode, e.g., a vertically emitting VCSEL (vertical cavity surface emitting laser), is collimated via a collimator lens L and, inclined in the line direction of graduation Gm, strikes scale Mm. At splitting location Pa, graduation Gm, taking the form of a transmitted-light graduation, splits the beam of rays into a $+1^{st}$ and a $-1^{st}$ order of diffraction. Both partial beams of rays subsequently strike scale Mf having graduation Gf in the form of a reflective graduation. By diffraction into the $-1^{st}$ and $+1^{st}$ order of diffraction, respectively, the two partial beams of rays are redirected into measuring direction Mr, while they are only reflected in the line direction. Graduation period df of graduation Gf amounts to only half of graduation period dm of graduation Gm. In the further ray trajectory, both partial beams of rays arrive once more at scale Mm, and by diffraction again at graduation Gm, are superposed at combining location Pb and brought to interference. The beams of rays exiting in the $-1^{st}$, $0^{th}$ and $+1^{st}$ resulting order of diffraction arrive at photoelements PE-1, PE0 and PE+1, which generate corresponding photoelectric currents. In the further signal pattern, the photoelectric currents are amplified and, e.g., in conventional manner, are supplied to an interpolator, which ascertains high-resolution position values from them. The requisite phase shift of, e.g., 120° in each case between the photoelectric currents is achieved in this exemplary embodiment by a special form of graduation Gm. It is implemented, e.g., as described in European Patent Application No. 0 163 362 as a phase grating having a line width of approximately 0.33*dm and a phase height of approximately 120°. Graduation Gf may be arranged as a phase graduation having a bar width of approximately dm/2 and a phase height of 180°.

Figure 3:
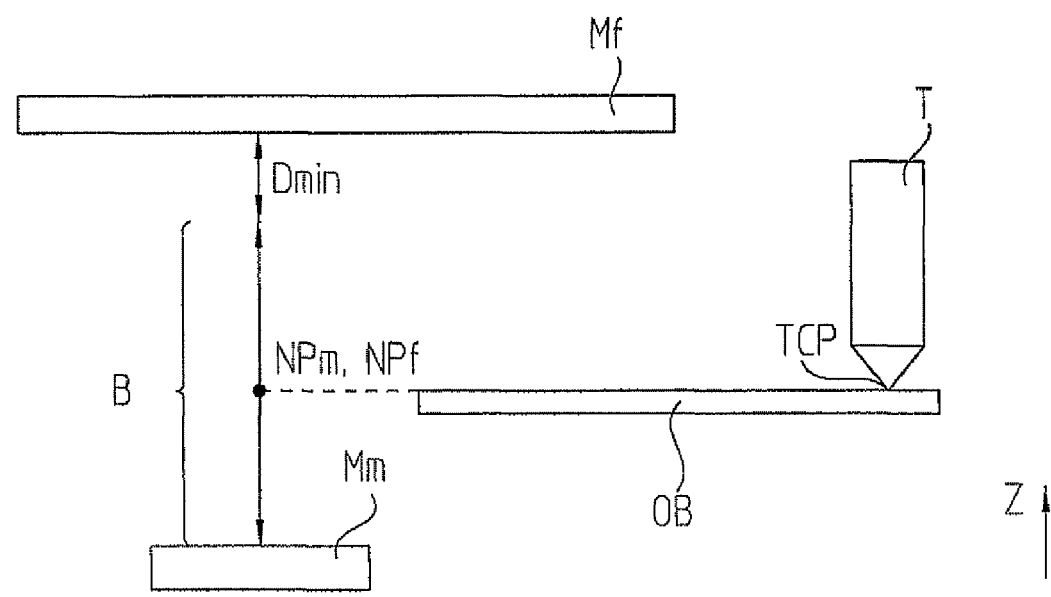
FIG. 3 shows the optimal Z-position of neutral pivots NPm and NPf.

Neutral pivots NPm and NPf of these scanning optics lie at the same location centrally between splitting location Pa and combining location Pb (see FIGS. 4a, 4b). This may be understood easily based on the method described above. Therefore, these scanning optics satisfy the very important prerequisite described for the optimal arrangement of a position-measuring device. In order for neutral pivots NPm and NPf to lie in favorable area B as illustrated in FIG. 3, in this example, moved graduation Gm is selected as a transmitted-light graduation, and fixed graduation Gf is selected as a reflective graduation. The scanning is therefore carried out from the side of the moved graduation, and not from the side of fixed graduation Gf as shown in PCT Published Patent Application No. WO 2007/034379. Scanning unit AE on one hand, which includes light source LD, lens L and photoelements PE-1, PE0 and PE+1, and fixed graduation Gf on the other hand, are therefore disposed on opposite sides of moved graduation Gm. To better illustrate this, the overall configuration is shown in FIG. 5 in perspective.

Figure 6:
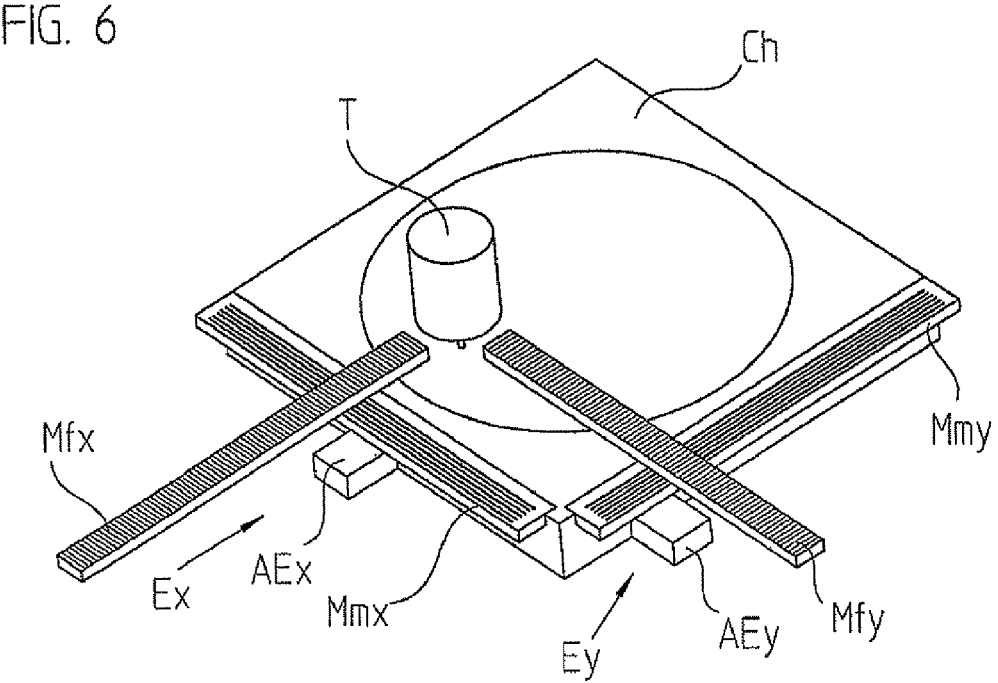
FIG. 6 shows a perspective view of a configuration of position-measuring devices illustrated in FIGS. 4a, 4b and 5 at an XY-table.

FIG. 6 also shows an overall system in perspective, in which an X-Y table Ch is equipped with two position-measuring devices Ex, Ey according to the previously described exemplary embodiment for detecting its movement in the X-direction and Y-direction.

In the present exemplary embodiment, graduation Gm in the form of a transmitted-light graduation may be applied on the side of movable scale Mm which is facing fixed scale Mf. Graduation Mf, formed as a reflective graduation, may also take the form of a back-surface graduation, which is applied on the side of scale Mf that is oriented facing away from scale Mm. The position of neutral pivots NPf and NPm is not altered by this.

The angle of illumination of the beam of rays emerging from lens L should be selected to be as small as possible, so that in the event of a change in distance between scanning unit AE and scale Mf, the offset of the beam of rays remains limited. A value of 20° should not be exceeded. The distance between the two scales Mm and Mf may be in the range of, e.g., 1-30 mm.

Alternative variants of the scanning optics of the position-measuring device are yielded, for example, by a different manner of generating phase-shifted signals such as, for example, using polarizing-optical scanning. In this case, $\lambda/2$- or $\lambda/4$-plates are introduced between scales Mf and Mm, and the two partial beams of rays are orthogonally polarized via them. To avoid unwanted heat loss, optical fibers may also be used for the illumination feed and for the optical signal feedback. Instead of laser diodes, other light sources such as LEDs may also be used.

Furthermore, it should be mentioned that, in contrast to the conventional systems discussed at the outset, the moved components of the scanning optics may be disposed on the opposite side of graduation Gf formed as a longitudinal graduation, and therefore below graduation Gm in the form of a transverse graduation.

The scanning optics, having fixed scale Mf and scale Mm moved relative thereto, including scanning unit AE, therefore ensures that the position of the two neutral pivots NPf, NPm of the two intersected scales Mf, Mm correspond.

Second Example Embodiment of Scanning Optics of a Position-measuring Device

Figure 7A:
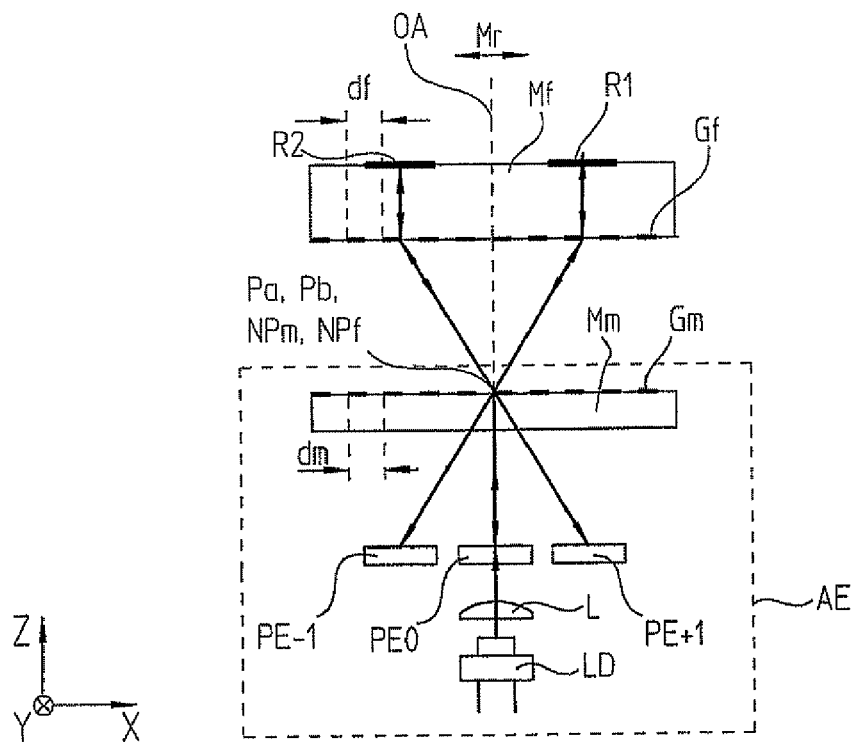
FIG. 7a shows a front view of scanning optics of a position-measuring device according to an example embodiment of the present invention.
Figure 7B:
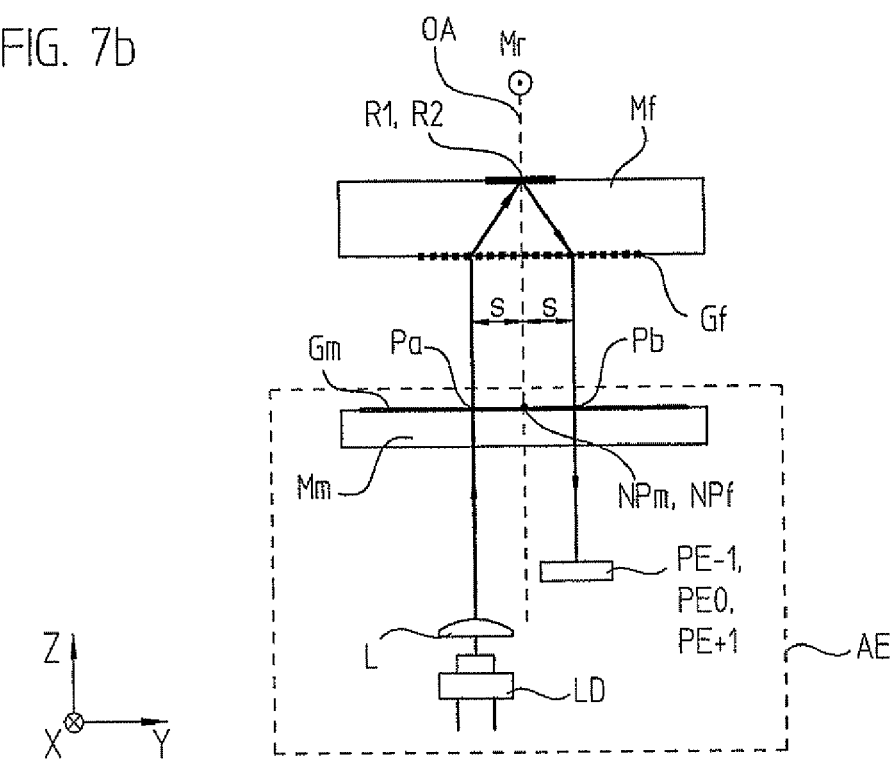
FIG. 7b shows a transverse view of the scanning optics of the position-measuring device.
Figure 8A:
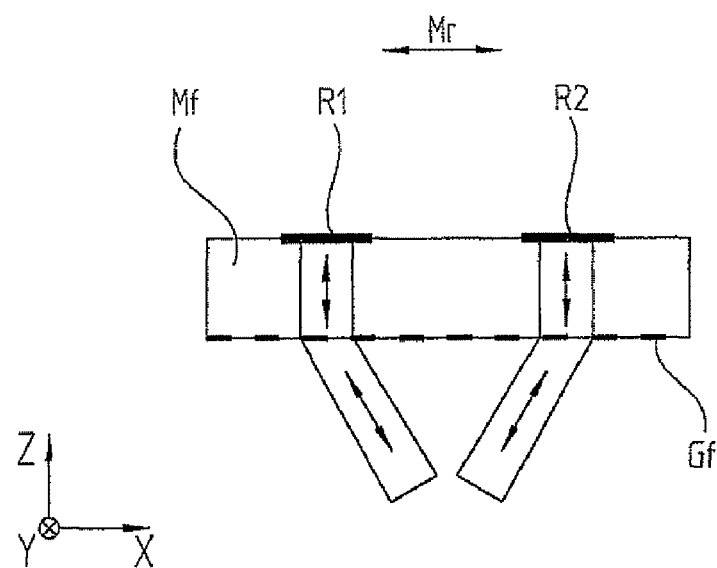
FIG. 8a shows a detailed front view for illustrating the deflection effect of the scale having retro-reflector effect in the position-measuring device illustrated in FIGS. 7a and 7b.
Figure 8B:
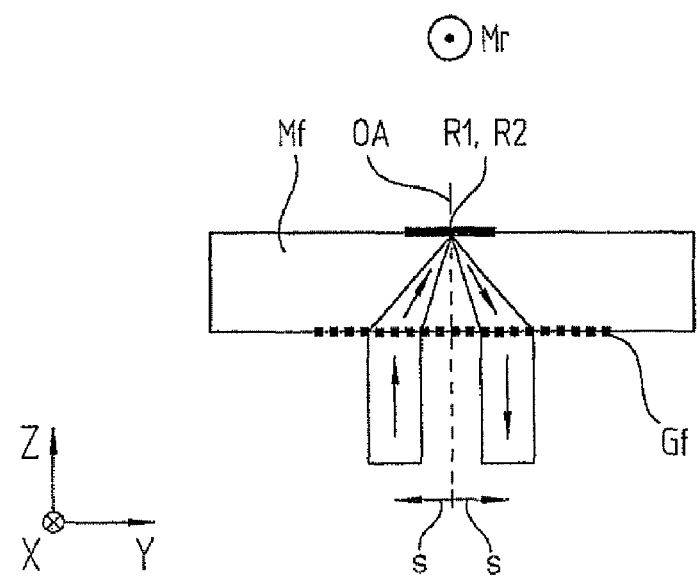
FIG. 8b shows a detailed transverse view for illustrating the deflection effect of the scale having retro-reflector effect in the position-measuring device illustrated in FIGS. 7a, 7b and 8.

FIGS. 7a and 7b shows scanning optics of a second exemplary embodiment of a position-measuring device in different views. The beam of rays from a laser diode LD is again collimated by a collimator lens L and is directed parallel to optical axis OA, perpendicularly to scale Mm. On the upper side of the scale, a graduation Gm in the form of a transmitted-light graduation splits the beam of rays into a $-1^{st}$ and $+1^{st}$ order of diffraction at splitting location Pa. Both partial beams of rays arrive at scale Mf which bears a graduation Gf, formed as a special transmitted-light graduation, on its lower side. This graduation Gf directs the partial beams of rays, as viewed in measuring direction Mr, parallel to optical axis OA. Transversely thereto, graduation Gf focuses the partial beams of rays and deflects them, so that in the focused state, they strike reflectors R1 and R2, respectively, on the back side of scale Mf. After being reflected, they arrive again at graduation Gf. There, they are deflected again in measuring direction Mr, the deflection taking place symmetrically with respect to the arriving beams of rays. Transversely to measuring direction Mr, graduation Gf collimates the partial beams of rays again and directs them in parallel to optical axis OA. The exiting partial beams of rays arrive back at graduation Gm, where they are superposed by diffraction in the $+1^{st}$ or $-1^{st}$ order of diffraction at combining location Pb and brought to interference. As in the first exemplary embodiment, the graduation structure of graduation Gm is selected so that the beams of rays exiting in $-1^{st}$, $0^{th}$ and $+1^{st}$ resulting order of diffraction, in each case phase-shifted by 120°, are modulated in their intensity and are detected by photoelements PE−1, PE0 and PE+1.

Similar as in the previous exemplary embodiment, scale Mm is secured to the XY-table and is displaceable with it in the X-direction and Y-direction, while schematically indicated scanning unit AE is moved along with the XY-table only in measuring direction Mr, and transversely thereto, remains fixed in position by linear guideways. Scale Mf is disposed in stationary manner.

A particular feature of this exemplary embodiment is in the form of graduation Gf. Hereinafter, it is also referred to as a retro-reflector graduation. For illustration, the optical path in the scanning ray trajectory in the area of scale Mf is shown in detail in FIGS. 8a and 8b. Graduation Gf, i.e., the retro-reflector graduation, in the form of a diffractive structure, implements two functions simultaneously.

First of all, it deflects the incident partial beams of rays into or counter to measuring direction Mr. This deflection effect corresponds to the optical effect of a periodic graduation having a graduation period df. Since graduation Gf, implemented as a transmitted-light graduation, is traversed twice, for this exemplary embodiment, df must be equal to graduation period dm of graduation Gm.

Secondly, graduation Gf represents a diffractive cylindrical lens. This cylindrical lens focuses the partial beams of rays transversely to measuring direction Mr onto reflectors R1 and R2, respectively, as is evident from FIG. 8b. The simultaneous deflection transversely to measuring direction Mr comes about due to offset S of the incident partial beams of rays with respect to center Z of the cylindrical lens. Reflectors R1 and R2 may be both in the form of metallic mirrors as well as interference mirrors.

The cylindrical lens, which is traversed twice in the optical path, together with reflectors R1 and R2, respectively, represents a retro-reflector that reverses the direction of the incoming beam transversely and only transversely with respect to measuring direction Mr. This retro-reflector has the same optical effect as a roof prism having a 90° prism angle. The retro-reflection makes it possible to compensate for substantially greater twists of scales Mm, Mf about optical axis OA. In response to such a tilting of scales Mm, Mf referred to as moiré twisting, opposite beam tilts of the two partial beams of rays occur transversely to measuring direction Mr. Without a retro-reflector, the moiré tilt causes a signal breakdown which, particularly in the case of position-measuring devices having a small signal period, is very great. Extremely small permissible tolerances with regard to the moiré tilt are the result. The retro-reflector compensates for the beam tilts transversely to measuring direction Mr, so that substantially greater moiré tolerances are allowed, even when working with position-measuring devices having a very small signal period. Further explanations regarding this can be found in German Published Patent Application No. 10 2005 029 917 and in German Published Patent Application No. 10 2006 042 743.

Figure 9:
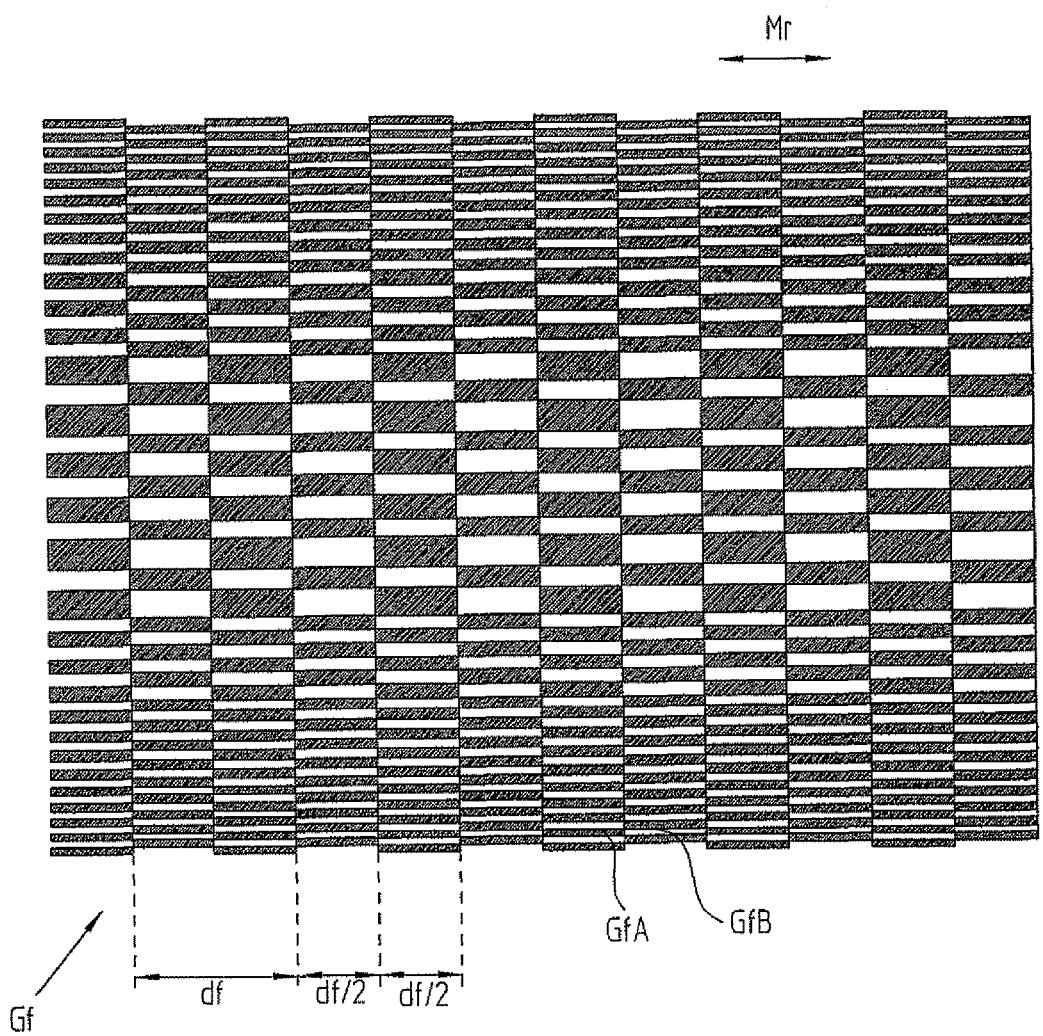
FIG. 9 shows a detail view of the structure of a graduation, formed as a retro-reflector graduation, in the position-measuring device illustrated in FIGS. 7a, 7b, 8a, and 8b.

In contrast to the (scanning) graduations described in German Published Patent Application No. 10 2005 029 917, the retro-reflector graduation, that is, graduation Gf, must deflect the incoming partial beams of rays both in and counter to measuring direction Mr, and therefore must possess the splitting effect of a normal graduation. The result is that graduation Gf must be dimensioned differently. FIG. 9 shows details of the structure of graduation Gf, i.e., of the retro-reflector graduation. It includes individual strips GfA and GfB, each having a width of df/2, which are disposed periodically in measuring direction Mr. The two strips GfA and GfB are complementary to each other, that is, the structures may be mutually transferred, in that the two states of the binary structure are interchanged at each position. Each strip GfA or GfB represents a diffractive cylindrical lens. It is calculated with the aid of the following phase function $\phi(y)$:

$$\varphi(y) = \left[ \frac{2\pi}{\lambda} \cdot n \cdot \sqrt{Df^2 + y^2} \right] \bmod 2\pi$$

where:
y:=transverse position
Df:=thickness of scale Mf
n:=refractive index of scale Mf
λ:=wavelength of light source used.

In strip GfA, the first state is present at each position where $|\phi(y)| \leq \pi/2$. In strip GfB, the complementary second state exists there. The binary structure may be formed as a phase graduation having a phase height of 180°. Since in the marginal area, the local graduation periods already lie in the range of wavelength λ, with the aid of numerical optimizations, phase heights and structure widths or forms are able to be adapted locally such that a maximum diffraction efficiency of the orders of diffraction used is achieved. As a rule, this optimization yields rounded structure elements instead of the rectangles shown in FIG. 9. It is possible—albeit costly—to form the strip-type cylindrical lenses as blazed structures.

As shown in FIG. 7b, graduation Gf, i.e., the retro-reflector graduation, produces a beam offset 2*S transversely to measuring direction Mr. This allows an illumination direction of the collimated light source perpendicular to scales Mm and Mf, and at the same time, a detection by photoelements PE−1, PE0 and PE+1 disposed adjacent in the y-direction. An oblique illumination direction as in the first exemplary embodiment is no longer necessary. Due to this high symmetry, particularly great positional tolerances are achieved with regard to the two scales Mm, Mf and scanning unit AE. Particularly for the distance between scales Mm and Mf, there is no longer any tolerance restriction relevant.

Third Example Embodiment of Scanning Optics of a Position-measuring Device

Figure 10:
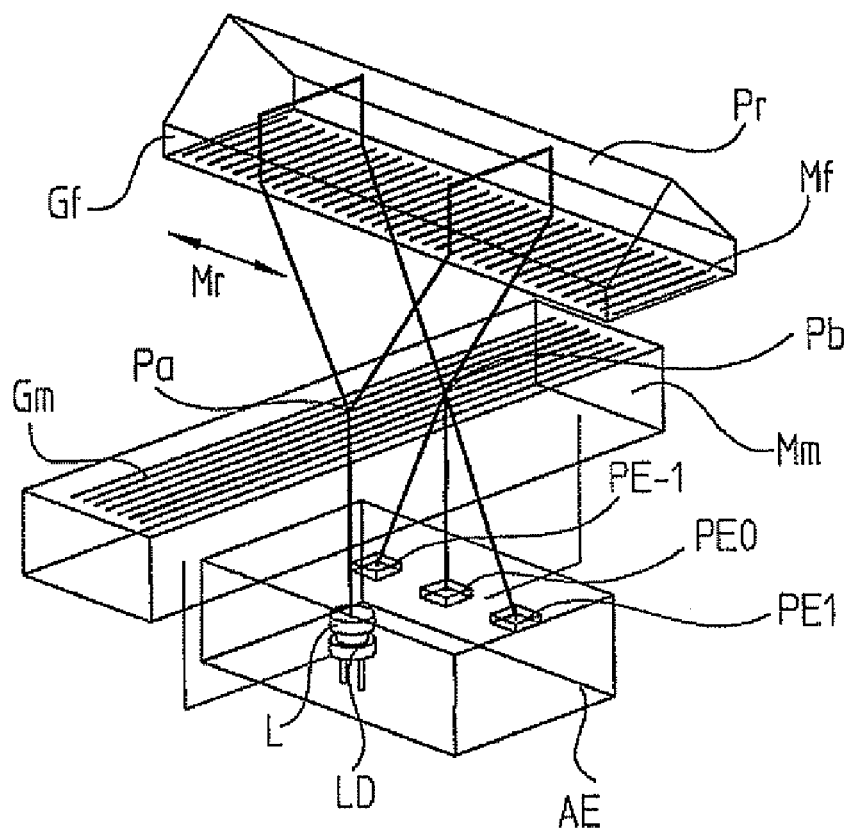
FIG. 10 shows a perspective view of scanning optics of a position-measuring device according to an example embodiment of the present invention.

FIG. 10 shows the scanning optics of a third exemplary embodiment of a position-measuring device in a perspective, in which a prism Pr is disposed on the back side of scale Mf, and prism Pr is in the form of a 90°-roof prism. The two functions of the diffractive retro-reflector graduation, i.e., graduation Gf of the second example embodiment, are distributed to the two components of scale Mf, that is, to graduation Gf and prism Pr. In this case, graduation Gf has the same graduation period as graduation Gm on scale Mm. The incoming partial beams of rays are thereby directed in measuring direction Mr along the optical axis. The 90°-roof prism performs the retro-reflection transversely to measuring direction Mr. The passage again of the partial beams of rays through graduation Gf in measuring direction Mr directs the two partial beams of rays in measuring direction Mr to a common combining location Pb on graduation Gm where, according to this exemplary embodiment, the interference of the two partial beams of rays takes place.

The two elements of scale Mf, that is, prism Pr and graduation Gf, are permanently joined to each other in this example. They may be monolithically produced. Alternatively, they may be produced separately and subsequently joined, e.g., by wringing. A separate mounting which fixedly joins the two elements is also possible. In a very cost-effective variant, instead of the 90°-roof prism, two narrow mirror strips are fixed relative to each other in the 90°-angle and used as retro-reflector.

With regard to the further function, reference is made to the second exemplary embodiment previously described.

A feature of the third example embodiment is the high attainable signal strength, since use is made of less dissipative, diffractive components. The interpolation quality of the following interpolation electronics may thereby be improved.

In general, both the retro-reflector graduation and the graduation having the mounted roof prism may be combined with a great number of scanning principles. Thus, it is easily possible to equip scanning optics with a moiré compensation, and possibly also to offer it as a selection alternative for the specific customer.

In the example embodiments described above, scales Mm and Mf have traversing or continuous graduation fields. Additional restrictions of the positional tolerances of scales Mm, Mf and of scanning unit AE relative to each other, which are necessary in the case of several specific embodiments described in PCT Published Patent Application No. WO 2007/034379 in order to conduct the individual beams of rays through the associated graduation fields delimited from each other, are not required in the example embodiments described herein.

Fourth Example Embodiment of Scanning Optics of a Position-measuring Device

Figure 11A:
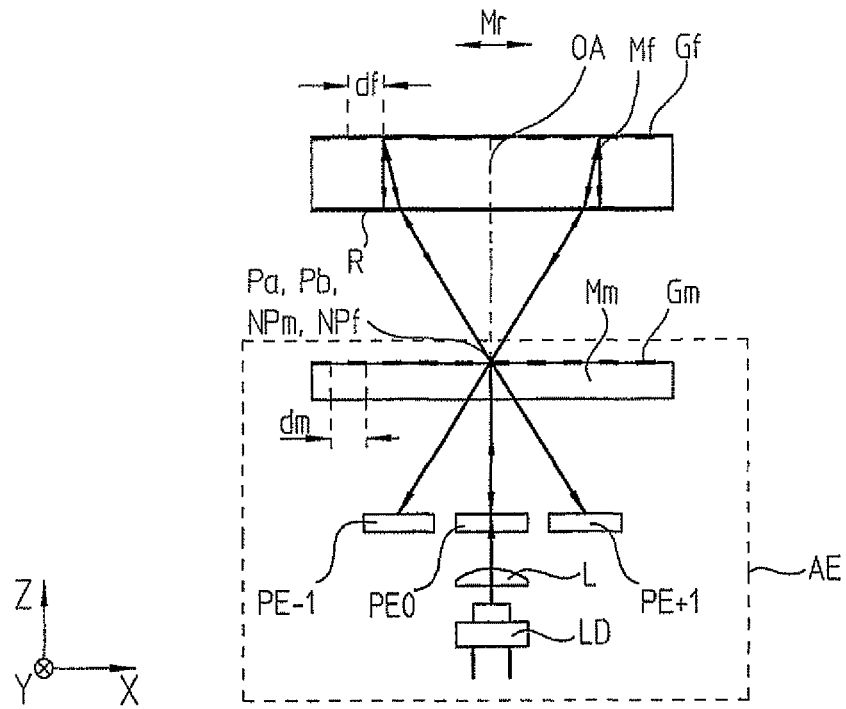
FIG. 11a shows a front view of scanning optics of a position-measuring device according to an example embodiment of the present invention.
Figure 11B:
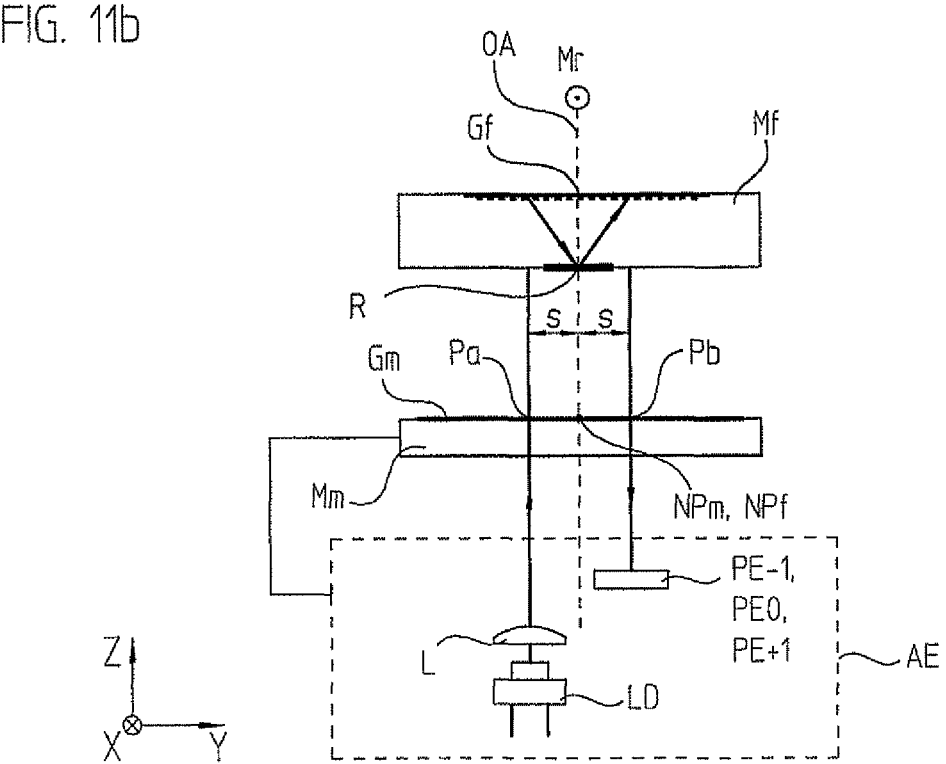
Figure 12A:
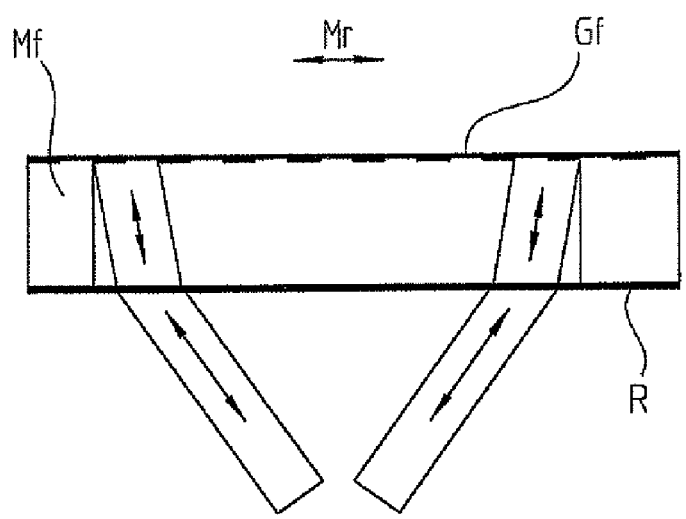
FIG. 12a shows another front view for illustrating the deflection effect of the scale illustrated in FIGS. 11a and 11b.
Figure 12B:
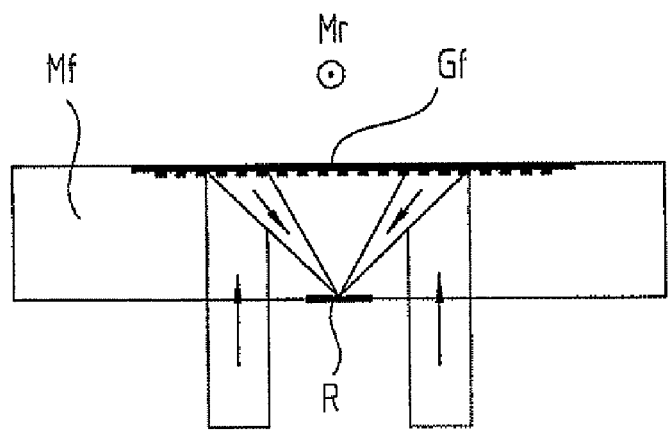
FIG. 12b shows a further front view for illustrating the deflection effect of the scale illustrated in FIGS. 11a and 11b.

FIGS. 11a and 11b show the scanning optics of a fourth exemplary embodiment of a position-measuring device, analogous to the illustrations of the second exemplary embodiment in FIGS. 7a and 7b. Analogous to the second exemplary embodiment, FIGS. 12a and 12b show the optical path in the scanning ray trajectory in the area of spatially fixed scale Mf.

The beam of rays from laser diode LD is collimated by a collimator lens L and directed parallel to optical axis OA, perpendicularly to movable scale Mm. At its upper side, graduation Gm, formed as a transmitted-light graduation, at splitting location Pa again splits the incoming beam of rays into partial beams of rays in a $-1^{st}$ and a $+1^{st}$ order of diffraction.

The two split partial beams of rays arrive at spatially-fixed scale Mf, which on its lower side, i.e., the side facing movable scale Mm, bears a reflective film R in a central area. Reflective film R has a reflective effect in the direction of the side facing away from movable scale Mm. Laterally adjacent to reflective film R, the split partial beams of rays are refracted at the lower side of spatially fixed scale Mf toward optical axis OA, and arrive at graduation Gf, taking the form of a reflective graduation, at the upper side of spatially fixed scale Mf. Reflective graduation Gf is in the form of a reflective phase grating, and in terms of its diffraction effect, possesses the same optical properties as graduation Gf, formed as a transmitted-light graduation, in the second exemplary embodiment illustrated in FIGS. 7a, 7, 8a and 8b. This means that the partial beams of rays falling on measuring graduation Gf, as viewed in measuring direction Mr, are directed in parallel toward optical axis OA, and transversely to measuring direction Mr, the partial beams of rays are focused onto reflective film R. Thus, the optical effect therefore corresponds again in superposition in measuring direction Mr to a splitting grating, and transversely to measuring direction Mr, to a diffractive cylindrical lens. The focal length of the diffractive cylindrical lens is selected such that the focus in the plane of reflective film R comes to lie on the same.

The partial beams of rays are subsequently reflected at reflective film R back in the direction of graduation Gf, where the partial beams of rays are collimated once more, and at the same time deflected in measuring direction Mr. Because of offset s between the incoming partial beam of rays and optical axis OA of the cylindrical lens, a beam offset 2s results between the partial beam of rays falling on spatially fixed scale Mf and the partial beam of rays coming out therefrom, transversely to measuring direction Mr, that is, in the y-direction. Upon leaving spatially-fixed scale Mf, the partial beams of rays are refracted again, and all strike graduation Gm of movable scale Mm at combining location Pb where, analogous to the second exemplary embodiment, they are superposed by diffraction in the $+1^{st}$ and $-1^{st}$ order of diffraction, respectively, and brought to interference. As in the second exemplary embodiment, the graduation structure of graduation Gm is selected so that the beams of rays exiting therefrom in $-1^{st}$, $0^{th}$ and $+1^{st}$ resulting order of diffraction, in the case of the relative movement of the components displaceable relative to each other, in each instance phase-shifted by 120°, are modulated in their intensity and are detected by photoelements PE−1, PE0 and PE+1.

Similar to the second exemplary embodiment, scale Mm is secured to the XY-table and is displaceable with it in the X-direction and Y-direction, while schematically indicated scanning unit AE is moved along with the XY-table only in measuring direction Mr, and transversely thereto, remains fixed in position by linear guideways. Scale Mf is disposed in stationary manner.

A feature of this exemplary embodiment is the form of fixed scale Mf, which is configured as a "back-surface scale" having a graduation Gf taking the form of a reflective phase grating. With regard to its specific optical properties, reference is made to the explanations for the second exemplary embodiment, which can be transferred to the reflective phase graduation.

A particular advantage in this example is that fixed scale Mf has a back-surface reflective graduation that is safe from becoming soiled. Dirt cannot penetrate into the grooves of the phase graduation, since the graduation is protected by a planar reflective film, e.g., a metallic film. The opposite side of fixed scale Mf has only flat surfaces which can easily be cleaned if soiled.

Fifth Example Embodiment of Scanning Optics of a Position-measuring Device

Figure 13A:
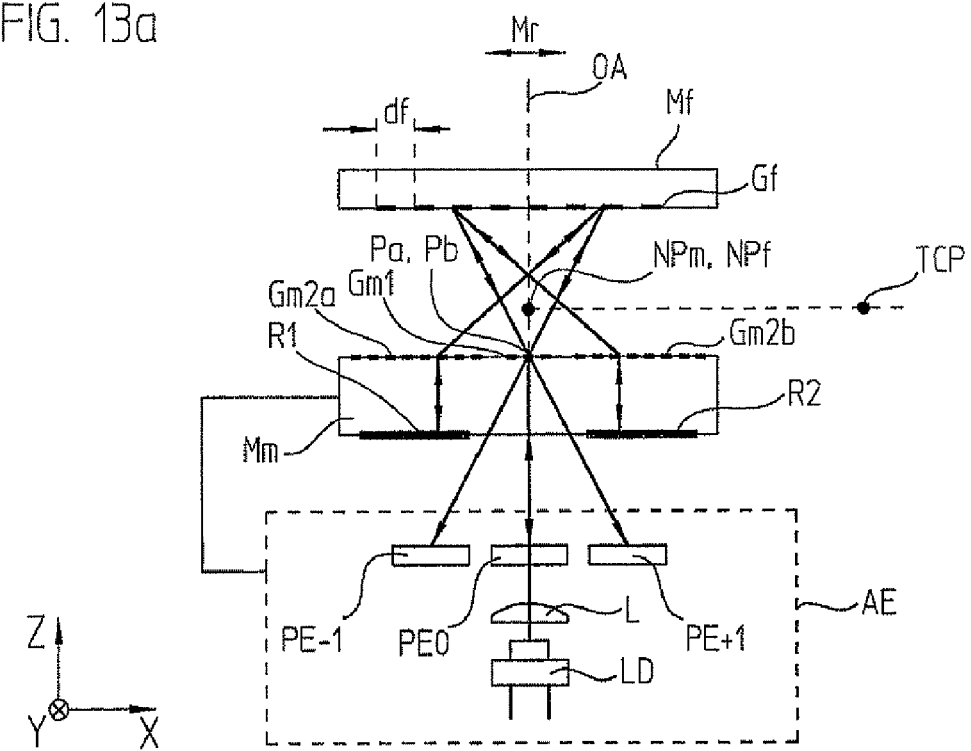
FIG. 13a shows a front view of scanning optics of a position-measuring device according to an example embodiment of the present invention.
Figure 13B:
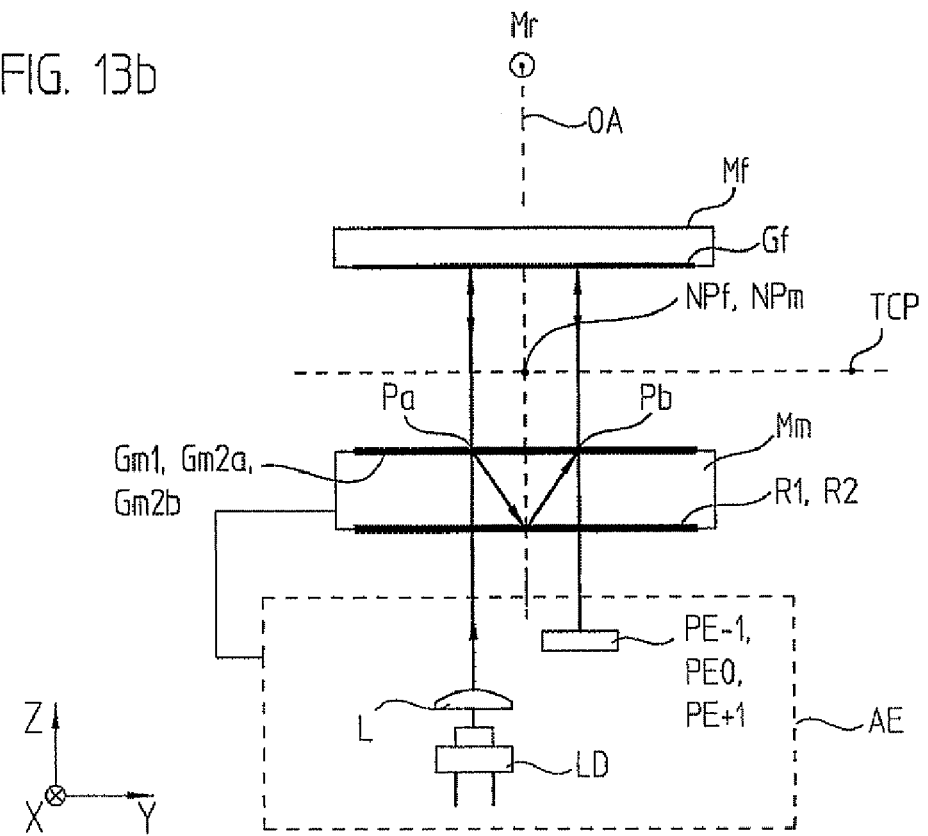

FIGS. 13a and 13b show the scanning optics of a fifth exemplary embodiment of a position-measuring device, analogous to illustrations of preceding exemplary embodiments.

The collimated beam of rays from laser diode LD strikes parallel to optical axis OA on movable scale Mm. A first transmitted-light graduation Gm1 having a graduation period dm at the upper surface of the scale splits the beam of rays incident at splitting location Pa into a $-1^{st}$ and a $+1^{st}$ order of diffraction. The two split partial beams of rays arrive at reflective graduation Gf of spatially fixed scale Mf and are diffracted back there. Due to the very small graduation period df<dm/2, the partial beams of rays arrive again at movable scale Mm offset in measuring direction x with respect to splitting location Pa. There, they are diffracted by second transmitted-light graduations Gm2a and Gm2b, respectively, which are disposed on both sides next to first transmitted-light graduation Gm1. Second transmitted-light graduations Gm2a, Gm2b are implemented similarly to graduations Gm of the second exemplary embodiment illustrated in FIGS. 7a, 7, 8a and 8b. Therefore, they direct the partial beams of rays in measuring direction x parallel to optical axis OA and focus them perpendicularly to measuring direction x onto reflectors R1 and R2, respectively, on the lower side of movable scale Mm. After reflection at R1 and R2, the partial beams of rays arrive again at graduation Gm2a and Gm2b, respectively, are redirected there again in measuring direction x and collimated again transversely to measuring direction x. After a further diffraction at grating Gf of spatially fixed scale Mf, the partial beams of rays are superposed again at combining location Pb by graduation Gm1 and brought to interference. Similarly as in the exemplary embodiments described above, photoelements PE−1, PE0 and PE+1 detect the beams of rays exiting in various directions.

The spatial position of neutral pivots NPm and NPf may be determined easily using the method described above. Due to the strong deflection effect of spatially fixed graduation Gf, these neutral pivots lie between scales Mm and Mf. The smaller that graduation period df is selected to be relative to graduation period dm, the higher neutral pivots NPf and NPm lie in the Z-direction. Therefore, they may be suitably adapted to the requirements of the application. An advantage results in that movable scale Mm may be secured lower on the table, and its upper side no longer has to be in alignment with the TCP. Therefore, it may easily be protected from collisions with the tool. In addition, the object to be measured (e.g., a wafer) can be removed more easily from the table, since movable scale Mm no longer has to project beyond the upper edge of the table by the thickness of the object to be measured (wafer).

Besides the examples described, there are also a multitude of further example embodiments within the scope of the present invention.

What is claimed is:

1. A position-measuring device for measuring a position of an object relative to a tool having a tool center point, comprising:
   at least two intersected scales displaceable relative to each other in at least one plane of movement, each scale having a neutral pivot about which a tilt of the scale causes no change in a detected position; and
   an optical scanning unit configured to generate position signals for at least one measuring direction parallel to the plane of movement;
   wherein a position of the neutral pivots of the two scales correspond;
   wherein the scales are arranged above and below the tool center point; and
   wherein the neutral pivots of the scales and the tool center point are arranged in a plane parallel to the plane of movement.

2. The position-measuring device according to claim 1, wherein the scales include a spatially-fixed scale having a graduation and a movable scale that intersects and is movable relative to the spatially-fixed scale and has a graduation, wherein the movable scale disposed below the spatially fixed scale, the scanning unit disposed below the movable scale, the neutral pivots of the two scales arranged at least one of (a) in an area between the two scales and (b) on the movable scale.

3. The position-measuring device according to claim 1, wherein positional deviations of the neutral pivots from the tool center point perpendicular to the plane of movement are less than 1 mm.

4. The position-measuring device according to claim 2, wherein the graduation of the movable scale is arranged on a side of the movable scale facing the spatially-fixed scale.

5. The position-measuring device according to claim 4, wherein the graduation of the movable scale and the tool center point are arranged in a plane parallel to the plane of movement.

6. The position-measuring device according to claim 2, wherein the graduation of the movable scale is arranged as a transmitted-light graduation.

7. The position-measuring device according to claim 1, wherein the scanning unit includes a light source and at least one photoelement, the light source configured to emit a beam of rays that strikes the graduation of a movable one of the scales at an impact location where the beam of rays is split into several partial beams of rays, the split partial beams of rays strike a graduation of a spatially-fixed scale and are reflected back in a direction of the movable scale, where the partial beams of rays reflected back are superposed at a combining location on the graduation of the movable scale and brought to interference; and
   wherein beams of rays exit from the combining location on the graduation of the movable scale in at least one spatial direction and arrive at the at least one photoelement in the scanning unit, the at least one photoelement configured to detect modulated photoelectric currents as a function of displacement.

8. The position-measuring device according to claim 7, wherein the scanning unit includes a plurality of photoelements, and at the combining location on the graduation of the movable scale, several beams of rays exit in different spatial directions and arrive at the plurality of photoelements, the photoelements configured to detect several phase-shifted modulated photoelectric currents as a function of displacement.

9. The position-measuring device according to claim 8, wherein the graduation of the movable scale is arranged as a phase grating having a line width of ⅓* dm and a phase height of 120°, dm representing a graduation period of the graduation of the movable scale, so that phase-shifted photoelectric currents having a phase shift of 120° result at the photoelements.

10. The position-measuring device according to claim 7, wherein the graduation of a spatially-fixed one of the scales is arranged as a reflective graduation.

11. The position-measuring device according to claim 10, wherein an angle of illumination of the beam of rays emitted from the light source is less than 20°.

12. The position-measuring device according to claim 7, wherein a spatially-fixed one of the scale includes a graduation and at least one reflector element; and
   wherein the split partial beams of rays strike the graduation of the spatially-fixed scale, the graduation configured to deflect the partial beams of rays in the measuring direction and to focus the partial beams of rays transversely to the measuring direction, the partial beams of rays subsequently reflected by the at least one reflector element and arrive again at the graduation of the spatially-fixed scale, the graduation deflecting the partial beams of rays again in the measuring direction and collimating the partial beams of rays transversely to the measuring direction, so that the partial beams of rays are reflected back in a direction of the movable scale.

13. The position-measuring device according to claim 12, wherein the graduation of the spatially-fixed scale is arranged as a diffractive structure that represents a superposition of a grating deflected in the measuring direction, and a diffractive cylindrical lens focused transversely to the measuring direction.

14. The position-measuring device according to claim 7, wherein a spatially-fixed one of the scales includes a graduation and a prism; and wherein the partial beams of rays falling on the spatially-fixed scale initially strike the graduation of the spatially-fixed scale, the graduation deflecting the partial beams of rays in the measuring direction, the partial beams of rays subsequently reflected by the prism and arrive again at the graduation of the spatially-fixed scale, the graduation deflecting the partial beams of rays again in the measuring direction, so that the partial beams of rays are reflected back in a direction of the movable scale.

15. The position-measuring device according to claim 14, wherein the prism is arranged as a 90°-roof prism.

16. The position-measuring device according to claim 12, wherein the graduation of the spatially-fixed scale is arranged as a back-surface reflective graduation.

17. The position-measuring device according to claim 1, wherein the scanning unit includes a light source and at least one photoelement, the light source configured to emit a beam of rays to strike the graduation of a movable one of the scales at a splitting location where the beam of rays is split into several partial beams of rays, the split partial beams of rays then strike the graduation of a spatially-fixed one of the scales where the partial beams of rays are reflected back in a direction of the movable scale, where the partial beams of rays reflected back, offset with respect to the splitting location, strike graduations of the movable scale that deflect the partial beams of rays in the measuring direction and focus the partial beams of rays in a direction perpendicular to the measuring direction, to be diffracted again, after reflection at reflectors of the movable scale, by the graduations and, after a further diffraction at the graduation of the spatially-fixed scale, to arrive at a combining location on the graduation of the movable scale at which beams of rays exit in at least one spatial direction and arrive at the at least one photoelement in the scanning unit, the at least one photoelement configured to detect modulated photoelectric currents as a function of displacement.

18. The position-measuring device according to claim 1, the scales include a spatially-fixed scale and a movable scale, graduation lines of the graduations of the spatially-fixed scale and of the movable scale inclined at 45° with respect to outer edges of the scales.

19. The position measuring device according to claim 7, wherein the beam of rays, emitted by the light source, strikes the movable scale inclined in the line direction of the spatially-fixed scale.

20. The position measuring device according to claim 7, wherein the two interfering beams of rays intersect at the position of the neutral pivots of the two scales.

* * * * *